United States Patent [19]

Kramer

[11] 3,959,979

[45] June 1, 1976

[54] DUAL VOLTAGE FORCED AIR HEAT EXCHANGER

[76] Inventor: Daniel E. Kramer, 2009 Woodland Drive, Yardley, Pa. 19067

[22] Filed: Dec. 9, 1974

[21] Appl. No.: 531,228

Related U.S. Application Data

[63] Continuation-in-part of Ser. Nos. 205,065, Dec. 6, 1971, Pat. No. 3,853,174, and Ser. No. 401,265, Sept. 27, 1973, Pat. No. 3,877,243.

[52] U.S. Cl. .................................. 62/89; 62/180; 62/186; 165/39
[51] Int. Cl.² ............................ F25D 17/06
[58] Field of Search ............ 318/305; 62/181, 182, 62/180, 186, 89; 165/39

[56]         References Cited
        UNITED STATES PATENTS

| 2,273,992 | 2/1942 | Robb | 62/180 |
| 2,451,385 | 10/1948 | Groat | 62/181 |
| 2,544,592 | 3/1951 | Feinberg | 62/186 |
| 2,835,476 | 5/1958 | Kobut | 62/180 |
| 2,884,764 | 5/1959 | Siggelin | 62/186 |

*Primary Examiner*—Lloyd L. King
*Attorney, Agent, or Firm*—Daniel E. Kramer

[57]         ABSTRACT

This patent describes forced air heat exchangers using single phase A. C. motors to drive their fans and a method of securing high and low speed operation of the motors by connecting them alternately in delta and wye across a 3-phase power supply.

5 Claims, 4 Drawing Figures

DUAL VOLTAGE FORCED AIR HEAT EXCHANGER

BACKGROUND

This is a continuation-in-part of application Ser. No. 205065 filed 12-6-71, now U.S. Pat. No. 3,853,174, and application Ser. No. 401,265 filed 9-27-73, now U.S. Pat. No. 3,877,243.

FIELD

Refrigeration systems, in the course of their cooling the desired area or product, must reject the heat absorbed at the cold element (plus the work put in by the compressor motor to move the heat) at a hot element. The cold element is called an evaporator; the hot element is called a condenser. Refrigeration systems were initially designed with their condensing elements of the type that employed water for carrying away the heat. As refrigeration systems grew in size and as the cost of water supply distribution and waste increased, refrigeration systems designers began to use air instead of water to cool the condensing element. Air has the virtue of being clean, non-corrosive and available for only the cost of blowing it through the condensing element. In addition, the use of air for this purpose, until recently, created no environmental pollution since the condensing element affected the air chemically in no way and added no dissolved or suspended particles to the air used.

Recently, however, it has been discovered that forced air circulation refrigerant condensers are responsible for a type of environmental pollution which in inhabited areas must be controlled. The pollution generated by these forced air circulation condensers is noise.

The sound power generated by fans is sharply related to the fan speed by the law dB change = 50 $\log_{10}$(-Speed$_2$/Speed$_1$).

This formula indicates that reduction of a given fan speed by a factor of two would result in a reduction in emitted sound power of 15dB. This is by contrast with the situation where two fans are operating and one is shut off reducing the emitted sound power by a factor of two which causes a reduction of emitted sound of only 3dB.

These relationships and facts about the sound produced by fans are well known (see Handbook of Noise Control, Harris, Edition 1957, chapter 25, page 10 ff.

Power savings also result when the fan speed is reduced. Evaporators using motor-powered fans have traditionally been connected to run at full speed both when the compressor is on and when it is off. This invention shows the method whereby the motors of a forced draft evaporator can be operated at lower speed while the compressor is off, thereby sharply reducing the amount of power consumed by the system. The power saved is the sum of the power not used by the evaporator motors operating at lower speed and the power not used to drive the compressor, which otherwise would have had to operate to pump out the extra heat added to the refrigerator by the fan motors operating at higher speed.

PRIOR ART

The concept of controlling motor speed is well known. To this time, two major means for controlling speed on A.C. motors have been employed. The first required the use of specially designed and wound two speed fan motors. The second requires a motor whose speed is affected by the input voltage, along with a reactor, a resistor, or other device, well known to those who are well versed in the electric and electronic sciences, inserted in series with the power supply circuit to the motor which serves to reduce the input voltage or reduce the energy content of the input alternating electricity.

Motors correctly designed for operation at reduced voltages will then slow down and the fans which they drive will emit less noise in accord with the previously stated formula.

For small motor horse powers it is relatively economical to secure dual speed wound motors or even to supply reactors or resistors for the purpose of reducing the effective voltage applied to the motor.

Large fans, which by virtue of their size, are more prone to contribute large quantities of noise to the atmosphere, use large motors to drive them. Specially wound large motors specifically designed for two speed operation are very costly compared to the single speed version. In addition, the speed reduction achieved by most two speed motors is in the range of 1150 to 850 RPM, a reduction of 25%, which would produce a change in emitted sound power of 6.2dB, a barely detectable change. Reactors for large motors are costly because they must handle large currents. For example, one commercially available air cooled condenser uses five ¾ horse power fan motors, each drawing 6 amperes at 220 volts. A reactor capable of carrying 30 amperes continuously would have to be used for speed control. Such a device itself would be non-standard and very costly compared to the cost of the motors. A voltage dropping resistor would have to have the ability of dissipating, without overheating, over 3½ kilowatts of energy.

SUMMARY OF THE INVENTION

Alternating current motors used on most forced air heat exchangers, where the motors directly drive the fans (direct-drive type), are of the permanent split capacitor or shaded-pole construction. These can be designed with a relatively high slip characteristic. So designed, these motors can generally be employed for fan service at lower voltage than nameplate without overheating. Using time, light, temperature or sound as a control parameter, the invention suggests connecting alternating current fan motors normally operating at full voltage and full speed to a lower voltage and securing the high and low voltages from a 3-phase 4-wire network with grounded neutral, or alternately, a 3-phase 3-wire network with a phantom or ungrounded neutral or common established by the interconnection point of the motors.

DETAILED DESCRIPTION OF THE DRAWINGS

Figure 1:
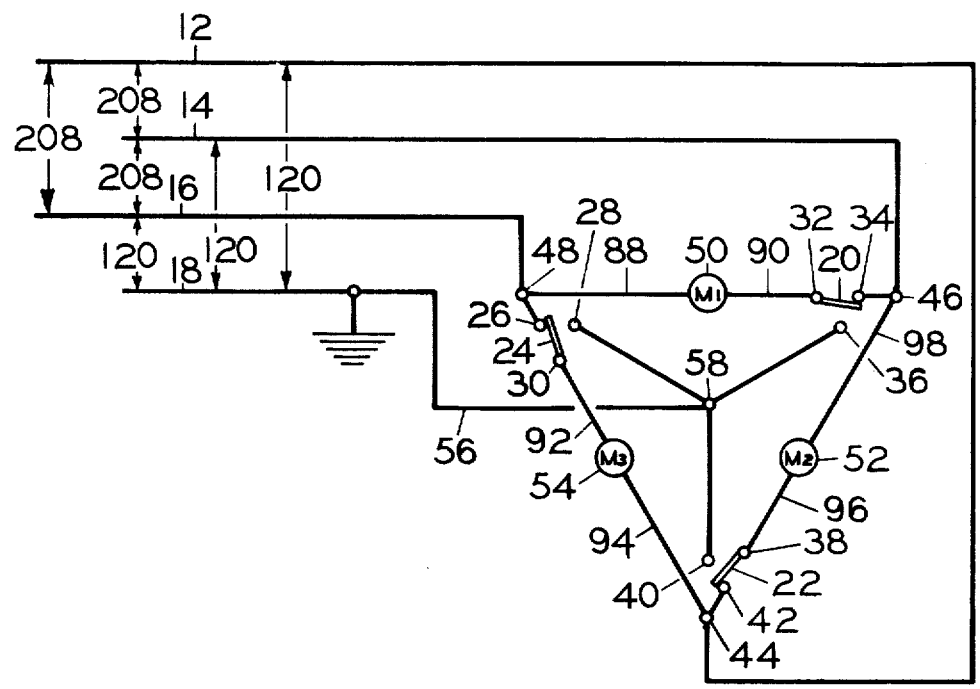
FIG. 1 illustrates schematically how one or more motors can be connected into a 4-wire 3-phase network to secure higher or lower voltage power source to the motors.

FIG. 1 shows a schematic wiring diagram wherein three motors M1, M2 and M3 each driving fans which propel air over an air cooled heat exchanger as shown in U.S. Pat. No. 3,853,174, are connected into a 3-phase 4-wire network in such a way that they can be subjected either to higher or lower voltage and through their inherent characteristics are able therefore to operate at higher and lower speeds. The typical 3-phase 4-wire network is characterized by three conductors, 12, 14 and 16 and a neutral 18. The voltage between any two conductors is approximately 208 volts. The voltage between any conductor 12, 14 and 16, and the neutral 18 is 120 volts. A 3-pole double-throw switch is provided, having three moving contacts, 20, 22 and 24. Each moving contact has an electrical connection, 32, 42 and 30 respectively. The motors are of the permanent split capacitor type, a design well known in the refrigerating and air conditioning industry. Each motor has two leads as power connections. Motor M1 has one lead 88 connected to conductor 16; its second lead 90 to the moving contact terminal 32 of one portion of the 3-pole double-throw switch. Motor M2 has one lead 98 connected to the second conductor 14 of the 3-phase network. Its second lead 96 is connected to the moving contact 22 of the switch. Motor M3 has one lead 94 connected to the third conductor 12 of the 3-wire power source. Its second lead 92 is connected to the moving contact of the third pole of the 3-pole switch 30. The three movable contacts of the switch in one position mate respectively with stationary contacts 26, 34, 42. In the second position the movable contacts mate respectively with stationary contacts 28, 36 and 40. These three stationary contacts are connected together at common point 58 and joined by wire 56 to the grounded neutral 18.

When the switch is in its first condition, motor M1 is connected by one lead 88 to junction 48 and conductor 16 of the 3-phase network. Its other lead 90 is connected through moving contact 20 and stationary contact 34 to conductor 14. The potential between these power supply conductors 14 and 16 is 208 volts. Motor M2 is connected by one lead 98 to junction 46 which is connected to conductor 14. Its second lead 96 is connected through the moving contact 22 and the stationary contact 42 to junction 44 which is connected to conductor 12. The potential between conductors 12 and 14 is 208 volts. Motor M3, also has two leads. One lead 94 is connected to junction 44, which is connected to conductor 12. Its second lead 92 is connected through movable contact 24 and stationary contact 26 to junction point 48 which is connected to conductor 16. The potential between conductors 12 and 16 is 208 volts. Therefore, when the switch is in the first condition, each motor is so connected in the 3-phase network that the potential across it is 208 volts or full line voltage.

When the switch is moved to the second position, the movable contacts are drawn away from the stationary contacts 26, 34 and 42 and instead drawn into electrical contact with the coordinate stationary contacts 28, 36 and 40. In this condition, motor M1 has one lead 88 connected to junction point 48 and through it to conductor 16; its second lead 90 is connected by way of the movable contact 20 to stationary contact 36 to junction point 58 which is connected to neutral 18. Motor M2 has one lead 98 connected to junction point 46 which is connected in turn to conductor 14. Its second lead 96 is connected through movable contact 22 and stationary contact 40 to junction point 58 which is connected in turn to common 58. Motor M3 has one lead 94 connected to junction point 44 which is connected in turn to conductor 12. Its second lead 92 is connected through moving contact 24 to stationary contact 28 which is connected to common 58. The potential between each of the three network wires 12, 14 and 16 and the common 58 in each case is 120 volts.

Therefore, with the switch in its second position, each motor in this condition is connected to a power supply of 120 volts in contrast with the 208 volt power supply to each motor with the switch in its first condition.

Figure 2:
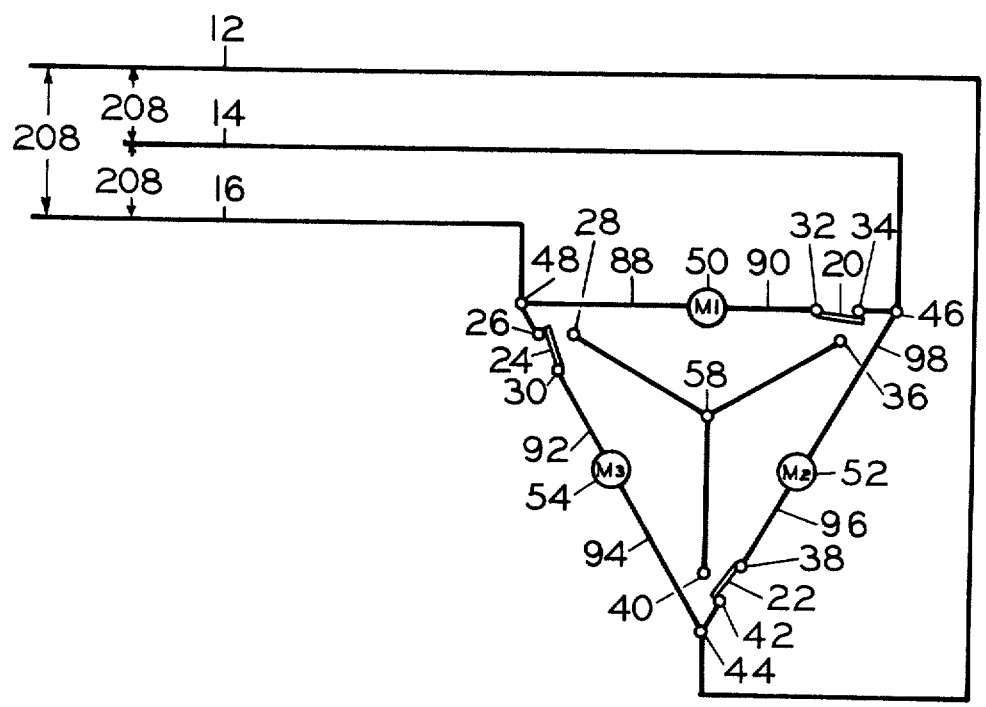
FIG. 2 shows how two or more motors can be connected into a 3-wire 3-phase network to secure higher or lower voltage power supply to the motors.

Referring now to FIG. 2: In certain circumstances, only a 3-wire 3-phase network is provided. It is still possible in this case to achieve the practical effect of a 4-wire 3-phase network. This is achieved by connecting the motors in such a way that a "phantom" neutral, 58, is created, which is ungrounded. This phantom neutral can be used with two or more motors, as shown in FIG. 2. The use of this phantom neutral instead of an actual grounded 4-wire neutral, as discussed in FIG. 1, produces a voltage across each motor which is not precisely the same as when the grounded neutral is used, but which in every case produces the desired reduction in motor speed. The motors used with the phantom neutral must all have essentially the same characteristics. An attempt to use a larger and a smaller motor together will result in normal operation at high speed condition but unbalanced operation during the low speed condition where the smaller motor will run faster and the larger motor will run slower because the current flow through the larger motor is limited by the possible flow through the smaller, while the current flow through the smaller is relatively unrestricted by the relatively low impedance of the larger. Otherwise, the operation of the system of FIG. 2 and of FIG. 1, already described in detail, is identical.

Figure 3:
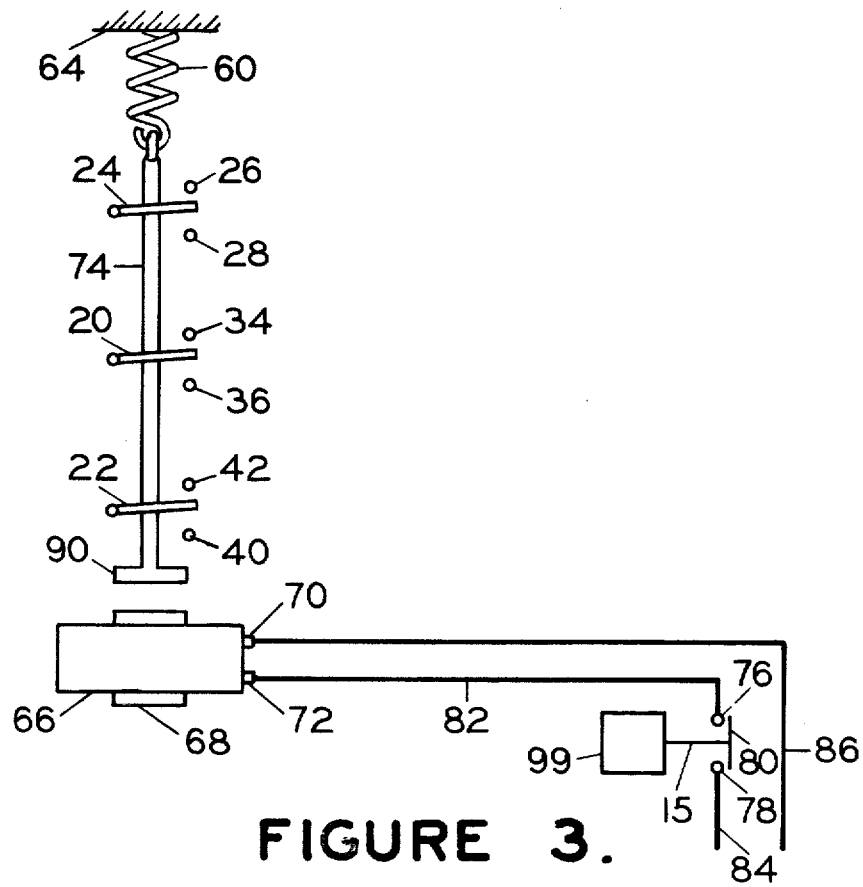
FIG. 3 shows a schematic representation of the 3-pole double throw relay used in FIGS. 1 and 2 with its control circuit.

FIG. 3 shows an enlarged detail of a 3-pole double-throw switch, actuated by a spring and a magnetic coil. This switch can be used in the wiring schematic of FIGS. 1 and 2. The drawing discloses the three moving contacts 20, 22 and 24, each mating in the de-energized condition with its respective stationary contacts 34, 42 and 26, and in the energized condition, with its respective stationary contacts 36, 40 and 28. The energized condition and de-energized condition are each achieved by the energized or de-energized condition of the coil 66 which through its magnetic core 68 attracts or fails to attract armature 90. When the coil 66 is energized, armature 90 is attracted to it, overcoming the power of return spring 60. In the energized condition moving contact 22 mates with stationary contact 40; moving contact 20 mates with stationary contact 36; and moving contact 24 mates with stationary contact 28.

When the coil 66 is de-energized, the attractive force between iron core 68 and armature 90 is relaxed, allowing return spring 60 to overcome the residual attraction iron core 68 and armature 90 and pull the armature 90 away from it. In this de-energized condition, moving contact 20 mates with stationary contact 34; moving contact 22 mates with stationary contact 38; and moving contact 24 mates with stationary contact 26, producing the results described under the operation of FIGS. 1 and 2.

In FIG. 3 the energized and de-energized condition of relay coil 66 is controlled by switch 80, which makes and breaks its contacts 76 and 78, allowing and preventing flow of electricity to coil 66 from a power supply not shown to which wires 84 and 86 are connected. This power supply could be from any two of the main power supply wires 12, 14 and 16, or between any of the power supply wires 12, 14 or 16, and the grounded neutral 18, as shown in FIG. 1. The actuating element 99, which causes the switch 80 to open and close its contacts, is a thermostat which opens its contacts on a rise in temperature and closes them on a drop below a pre-determined set point. When the temperature at the thermostat rises, push rod 15 moves to the right, causing switch 80 to break the electrical connection between contacts 76 and 78. At that time coil 66 is de-energized, allowing return spring 60 to draw the platen upward and by so doing, cause electrical continuity between movable contact 24 and stationary contact 26; movable contact 20 and stationary contact 34; and movable contact 20 and stationary contact 42. In each case, closing of these pairs of contacts connects the respective motors M1, M2 and M3 across the main power supply wires 12, 14 and 16, providing full voltage across the motors for high speed operation.

When the ambient temperature at the thermostatic control element 99 falls below its setting, the actuator moves the control element 15 to the left, causing switch 80 to close connection between contacts 76 and 78, applying the power supply to the coil 66. This in turn attracts armature 90, overcoming the force of return spring 60 and moving the movable contact 24 away from stationary 26 and into connection with stationary contact 28. In turn, the movable contact 20 connects stationary contact 36, and movable contact 22 connects stationary contact 40. In this way the motors M1, M2 and M3 each have one lead connected to a respective main phase conductor 12, 14 and 16, and each has its other lead connected to common 58. In this condition the motors are exposed to voltage of 120 and therefore operate at a substantially lower speed than in the first condition when the thermostatic element 99 was at the higher temperature when they were exposed to direct line voltages of 208, at which higher voltage the motors operated at their normal rated speed. Actuating element 99 may also be a magnetic coil connected, for instance, in parallel to the coil of the compressor magnetic starter; a photo cell, a sound sensor, or a timer.

Figure 4:
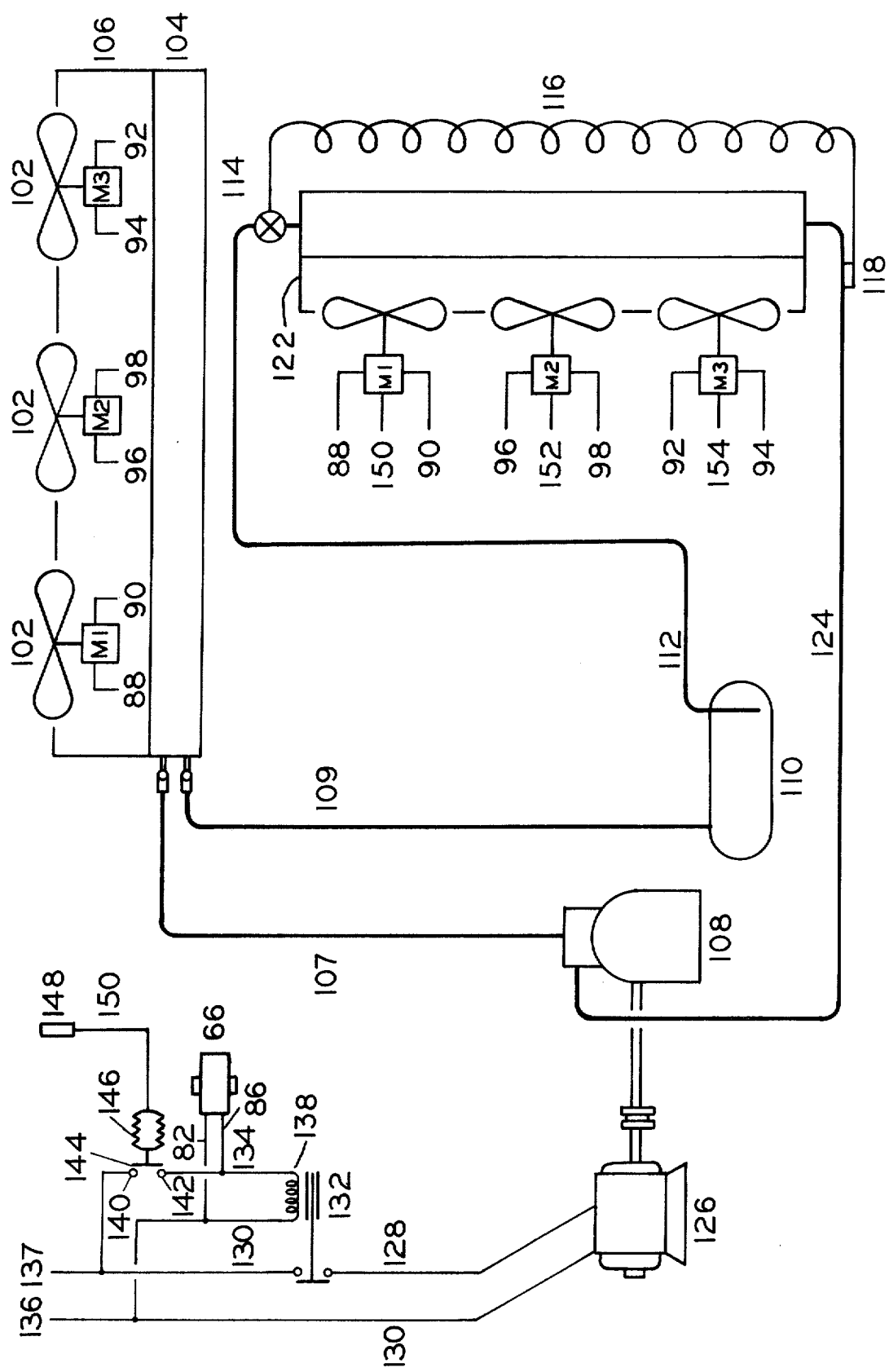
FIG. 4 shows a refrigeration system with forced air heat exchangers of the type which are used in this invention.

FIG. 4 shows schematically a refrigeration system having compressor 108 driven by compressor motor 126, drawing refrigerant vapor from suction line 124 and delivering the vapor compressed to a higher pressure to discharge line 107. The discharge line delivers the compressed vapor to heat exchange element 104 where it is brought into contact with air, not shown, drawn over the heat exchange element by fans 102 driven by motors M1, M2 and M3, which are the same motors shown schematically in FIGS. 1 and 2 and have leads correspondingly numbered 88 and 90, 96 and 98, 94 and 92.

The condensed refrigerant leaves heat exchange element 104 via pipe 109 and collects in receiver 110, where it is delivered via liquid line 112 to expansion valve 114 controlled by capillary tube 116 and bulb 118, which expansion valve 114 delivers and meters the liquid to evaporator coil 122 (evaporating heat exchange element) where the liquid is converted to a vapor and delivered to suction line 124 for recycling. Air is moved over evaporating heat exchange element 122 by the fans driven by motors 150, 152 and 154, which may be the same type motors shown in FIGS. 1 and 2.

Compressor motor 126 is supplied with power by its leads 130 and 128. The motor has on and off conditions established by switch element 132 which opens and closes the electrical power supply circuit to the motor 126. Coil 138 is energized or de-energized by the action of thermostat 146 employing sensing bulb 148 and moving contact 144 to make and break the connection between contact points 140 and 142. When thermostat 146 is warm, its bellows expand, bringing moving contact 144 into electrical mating connection with contacts 140 and 142 causing coil 138 to energize and drawing platen 132 with its related contact into a position where power is supplied to compressor motor 126. At the same time, by means of wires 82 and 86, coil 66 is also energized. Coil 66 is shown in an enlarged view as the actuating element in FIG. 3. Used in this way, evaporator fan motors 150, 152 and 154, otherwise designated as M1, M2 and M3, would, if connected in the circuits of FIGS. 1 or 2, produce a higher speed condition when the compressor is in its "on" condition and a lower speed condition when the compressor is in its "off" or de-energized condition.

Using the means of this invention, it is possible to connect one or more single phase motors which have higher voltage, higher speed, lower voltage, lower speed capability into a 3-phase 4-wire network or two or more single phase motors into a 3-phase 3-wire network so that the load is relatively more balanced than if the motors were connected to produce the higher voltage, higher speed, lower voltage, lower speed condition by the means described in application Ser. No. 205,065, now U.S. Pat. No. 3,853,174 or by means described in application Ser. No. 401,265 now U.S. Pat. No. 3,877,243. These past disclosures rely on any two of the main power supply conductors 12, 14 and 16, used as a single phase power supply for the high voltage connection, and grounded neutral 18 for the low voltage connection. Using the means of this invention, the 3-phase network can be applied to produce dual voltage effects, in turn producing multiple speed effects on condenser and evaporator fan motors used in refrigeration systems.

I claim:

1. A method of achieving two speed operation of fans in a forced air heat exchanger, said heat exchanger having a heat exchange element; fans positioned to move air over said element; alternating current motors adapted to drive said fans, said motors being of the type which operate at higher voltage, higher speed, lower voltage, lower speed; said motors having first power connection means and second power connection means; a common connection; multipole switch means having a first and a second position, said switch means being connected to the common connection, wherein the method comprises providing a poly-phase power supply having at least 3 conductors; connecting the conductors to the switch means; essentially equally distributing connection of first power connection means among at least two conductors; actuating the switch means to connect the second power connection means alternately to the conductors, causing the motors to operate at higher voltage, higher speed; and to the common, causing the motors to operate at lower voltage, lower speed.

2. A method as in claim 1 where the common is connected to a system neutral conductor.

3. A method as in claim 1 where the forced air heat exchanger is an evaporator in a refrigeration system, said system having a compressor with on and off conditions, and the switch is actuated in essential correspondence with said on-off conditions; whereby the motors are caused to operate at higher speed when the compressor is in its on condition and lower speed when the compressor is in its off condition.

4. A method as in claim 1 where the forced air heat exchanger is a condenser in a refrigeration system, including a control operatively positioned to actuate the switch.

5. A method as in claim 4 where the control is selected from the group consisting of photocell, thermostat, timer and sound level detector.

* * * * *